United States Patent

Lee et al.

[11] Patent Number: 5,815,409
[45] Date of Patent: Sep. 29, 1998

[54] CONTROL SYSTEM AND METHOD FOR AUTOMATIC SHUTDOWN OF A POWER SUPPLY

[75] Inventors: Hyung-Han Lee, Suwon-Si; Jee-kyoung Park; Yong-Seok Shin, both of Seoul, all of Rep. of Korea

[73] Assignee: SamSung Electronics Co., Ltd., Suwon, Rep. of Korea

[21] Appl. No.: 738,786

[22] Filed: Oct. 29, 1996

[30] Foreign Application Priority Data

Nov. 30, 1995 [KR] Rep. of Korea ................... 95 45629

[51] Int. Cl.$^6$ ........................................ G06F 1/26
[52] U.S. Cl. ............... 364/528.21; 365/226; 395/750.01
[58] Field of Search ...................... 364/492, 707, 364/187, 273.4, 273.5, 948.5, 948.6, 948.4; 323/283, 282; 307/65, 86, 85, 38, 39, 64, 66, 87; 326/9; 365/227, 228, 229, 222, 226; 361/18; 395/750.01, 750.02, 750.03, 750.04, 750.05, 750.06, 750.07, 750.08

[56] References Cited

U.S. PATENT DOCUMENTS

| | | |
|---|---|---|
| 4,288,831 | 9/1981 | Dolikian ............................. 361/92 |
| 4,516,214 | 5/1985 | Ray ..................................... 364/483 |
| 4,723,167 | 2/1988 | Griffey ................................ 358/190 |
| 5,047,987 | 9/1991 | Kosuge ............................... 365/228 |
| 5,157,270 | 10/1992 | Sakai .................................. 307/66 |
| 5,315,161 | 5/1994 | Robinson et al. .................. 307/66 |
| 5,375,247 | 12/1994 | Hueser ............................... 395/750 |
| 5,435,005 | 7/1995 | Saito .................................. 395/575 |
| 5,530,877 | 6/1996 | Hanaoka ............................ 395/750 |
| 5,541,458 | 7/1996 | Hirst ................................... 307/66 |
| 5,598,567 | 1/1997 | Ninomiya .......................... 395/750 |

Primary Examiner—Emanuel Todd Voeltz
Assistant Examiner—Tony M. Cole
Attorney, Agent, or Firm—Robert E. Bushnell, Esq.

[57] ABSTRACT

A control system for an automatic shutdown of a power supply constructed with a switching mode power supply (SMPS) receiving an AC voltage and converting the AC voltage into a DC voltage; a main board receiving the DC voltage output from the switching mode power supply; and a control circuit controlling and maintaining the supply of power from the switching mode power supply to the main board until a shutdown process is performed when power is turned OFF, wherein the control system enables the automatic shutdown of a power supply while preventing a file or a system from being damaged by automatically cutting off power after performing the shutdown process by the power control system even though the power switch is turned OFF due to the carelessness of the user or an external factor.

17 Claims, 3 Drawing Sheets

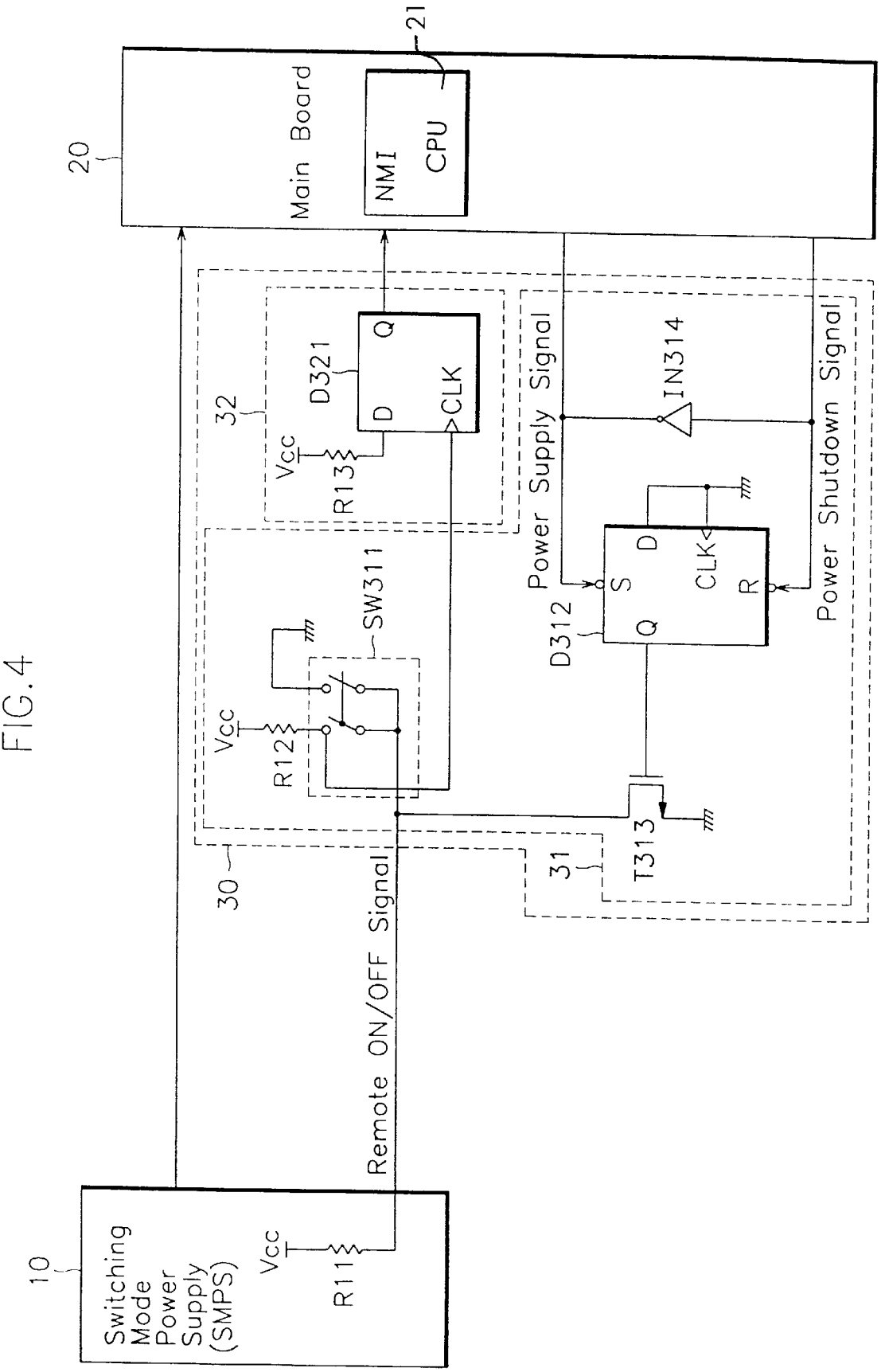

CONTROL SYSTEM AND METHOD FOR AUTOMATIC SHUTDOWN OF A POWER SUPPLY

CLAIM OF PRIORITY

This application makes reference to, incorporates the same herein, and claims all benefits accruing under 35 U.S.C §119 from an application entitled *Control System For An Auto Shutdown Of A Power Supply* earlier filed in the Korean Industrial Property Office on the 30$^{th}$ day of November 1995, and there duly assigned Serial No. 95-45629.

BACKGROUND OF THE INVENTION

1. Field of the Invention

The present invention relates to a control system for auto shutdown of a power supply, and, more particularly, to a control system for automatically shutting down a power supply while preventing damage to a file or a system by automatically cutting off power after performing a shutdown process even though a power switch is turned OFF due to carelessness of a user or due to an external factor.

2. Description of the Background Art

An exemplary power supply control system for a computer system contemplates inclusion of a switching mode power supply for receiving an alternating-current AC voltage and converting into a direct-current DC voltage, and a main board for receiving the DC voltage from the switching mode power supply by an ON/OFF operation of a power switch for controlling the state of a remote ON/OFF signal applied to the switching mode power supply, the operation of which is explained as follows.

The switching mode power supply receives the AC voltage and converts the AC voltage into the DC voltage. In addition, when the power switch in the main board is turned ON, a remote ON/OFF signal is transmitted. At this time, when the remote ON/OFF signal is received by the switching mode power supply, the switching mode power supply supplies the DC voltage to the main board, and when the power switch is turned OFF, the DC voltage supplied to the main board Is simultaneously cut off. It is possible to supply power by operating the switching mode power supply only when receiving the remote ON/OFF signal from a non-loaded power supply control system, while the DC voltage is not supplied, I have found, this power supply control system has a disadvantage in that when the switch is turned OFF, the DC current concurrently supplied to the main board is also cut off, thereby destroying any open file or damaging the system due to the power switch being turned OFF as a result of carelessness of a user or as a result of an external factor during operation.

Contemporary efforts in the art to avoid loss of data, file corruption or system failure are represented by exemplars such as the following U.S. patents incorporated herein by reference. By way of example, U.S. Pat. No. 5,157,270 to Shinji Sakai entitled *Reset Signal Generating Circuit* contemplates a reset signal generating circuit embodying a switching unit for supplying an on/off control signal to a switching element which performs on/off control over a power supply, and a reset unit arranged to detect the level of the on/off control signal and to forcedly produce a reset signal. The arrangement to detect the level of the on/off control signal controls the power supply and forcedly generates the reset signal, thus enabling the reset signal generating circuit to reset the body of a system, ie., a central processing unit, before the level of the power supply voltage substantially drops in an effort to lessen the possibility of faulty operation of the system. Sakai performs a reset operation according to the detected level of a voltage as the voltage level drops after power a power switch is shut off thus requiring circuitry for detecting the voltage level and for generating a reset signal when the voltage level reaches a predetermined level. U.S. Pat. No. 5,315,161 to Thomas S. Robinson, et al., for a *Power Failure Detection And Shut Down Timer*, discusses a system and method for providing power from a source of stored electrical energy to a microcomputer for a user established "ride-through" period of time after a disruption in the primary power supply for the microcomputer. If the primary power supply is not restored within the ride-through time period the system performs an orderly shut down of computer applications. Should stored energy reserves run low during the primary power disruption, the system instead performs an abbreviated, critical application shut down. Following application shut down, or upon the expiration of a user established "shut down" time period, the system performs an orderly shut down of computer system operations and thereafter removes all power from the computer. Shut down and shut off procedures are canceled, if possible, upon restoration of the primary power supply. Contrary to the present application, Robinson et al. does not utilize a power switch which may be accidently turned off and therefore needs not make any preparations for such an accidental turn off of power. Additionally, Robinson et al. performs a shutdown process by detecting loss of an AC voltage and switches to use of backup batteries in order to complete a shutdown process. As noted in Robinson et al., however, the backup batteries may not have sufficient power necessary to perform the contemplated shutdown process. We believe that the type of circuits represented by Sakai '270 and Robinson et al. '161, are not properly responsive to operation of the power switch.

More recent efforts, represented by U.S. Pat. No. 5,530,877 to Masaaki Hanaoka for *Apparatus For Providing Continuity Of Operation In A Computer* contemplates an apparatus for providing continuity of operation in a system which performs a process having a CPU, input/output, main memory and power supply by restoring the system state to the point when the power supply was last turned off or an even earlier time is provided. The apparatus includes a save process start detector for detecting a demand for power supply turn-off. The save process is triggered by, for example, the turning off of a power switch. A power switch state detector detects when a user turns the power switch off and provides an input to an interruption controller. A power off detection program is activated by the interruption controller. A system state saver outputs information indicative of the system state to an external storage in response to an instruction from the save process start detector. A post save processor turns the power supply off after the information indicative of the system state has been completely output to the external storage by the system state saver. We have found that Hanaoka's use of a plurality of programs, i.e., power off detection program, system saving program, process selecting program, process determination program and power off program, for controlling the interruption of energy drawn from a power supply, to be less reliable than necessary for safe operation of the system being powered by the supply.

SUMMARY OF THE INVENTION

Accordingly, it is an object of the present invention is to provide an improved power supply.

It is another object to provide a control system able to reliably execute an automatic shutdown of a power supply.

It is still another object to provide a controller generating an interrupt signal as soon as the power switch is turned off in order to control a system, e.g., a central processing unit, and to execute a shutdown process prior to allowing the voltage level applied to the system to drop, thereby ensuring that damage to a file or the system is prevented.

It is yet another object to provide a control system for automatic shutdown of a power supply which can prevent a file, or a system, from being damaged by automatically cutting off power after performing a shutdown process.

It is still yet another object to provide a control system for automatic shutdown of a power supply which can prevent a file or a system from being damaged by automatically cutting off power after performing a shutdown process even though a power switch is turned OFF due to carelessness of a user or an external factor, and thereby substantially obviate one or more of the problems due to limitations and disadvantages of the prior art.

It is also an object to provide a control system that integrates a program and hardware to control interruption of electrical energy furnished by a power supply to a computer system.

To achieve these objects and in accordance with the principles of the present invention, as embodied and broadly described herein, a control system for automatic shutdown of a power supply is constructed with a switching mode power supply (SMPS) receiving an AC voltage and converting the AC voltage into a DC voltage, a main board receiving the DC voltage output from the SMPS, and a control circuit inducing power supplied from the SMPS to be delivered to the main board until a shutdown process is performed when power is turned OFF.

Additional objects and advantages of the invention are set forth in part in the details of the following description, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein:

FIG. 4 is a detailed circuit diagram illustrating the control system for the auto shutdown of the power supply constructed according to the principles of the present invention.

DESCRIPTION OF THE PREFERRED EMBODIMENT

Figure 1:
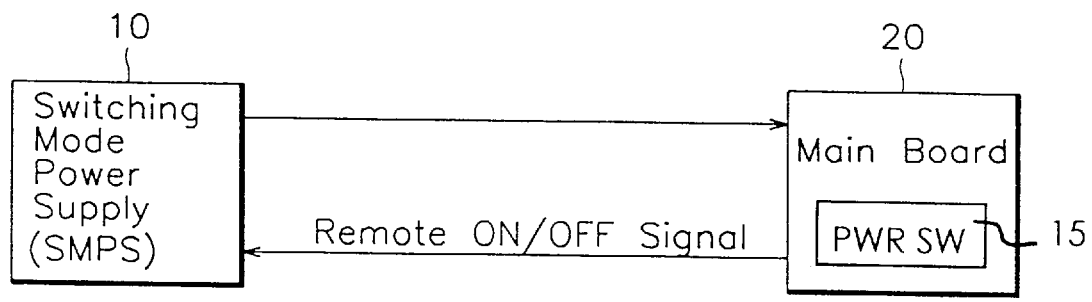
FIG. 1 is a block diagram illustrating a structure of an exemplary power supply control system.

Hereinafter, a power supply control system is explained with reference to an accompanying drawings. Turning now to the drawings, FIG. 1 illustrates a simplified power supply control system having a switching mode power supply (SMPS) 10 for receiving and converting an AC voltage into a DC voltage, and a main board 20 for receiving the DC voltage from SMPS 10 by an ON/OFF operation of a power switch 15 for controlling the state of a remote ON/OFF signal input into SMPS 10, i.e., when power switch 15 in main board 20 is turned ON, the remote ON/OFF signal is transmitted. When the remote ON/OFF signal is provided to SMPS 10, SMPS 10 supplies the DC voltage to main board 20, and when power switch 15 is turned OFF, the DC voltage supplied to the main board 20 is simultaneously cut off.

It is possible to supply power by operating SMPS 10 only when receiving the remote ON/OFF signal from a non-loaded exemplary power supply control system, while the DC voltage is not supplied. The exemplary power supply control system, however, has a disadvantage in that when power switch 15 is turned OFF, the DC current supplied to main board 20 is concurrently cut off, thereby destroying any file being worked on or damaging the system when power switch 15 is turned OFF due to carelessness of a user or an external factor during its operation.

Reference will now be made in detail to a preferred embodiment of the present invention, an example of which is illustrated in the accompanying drawings.

Figure 2:
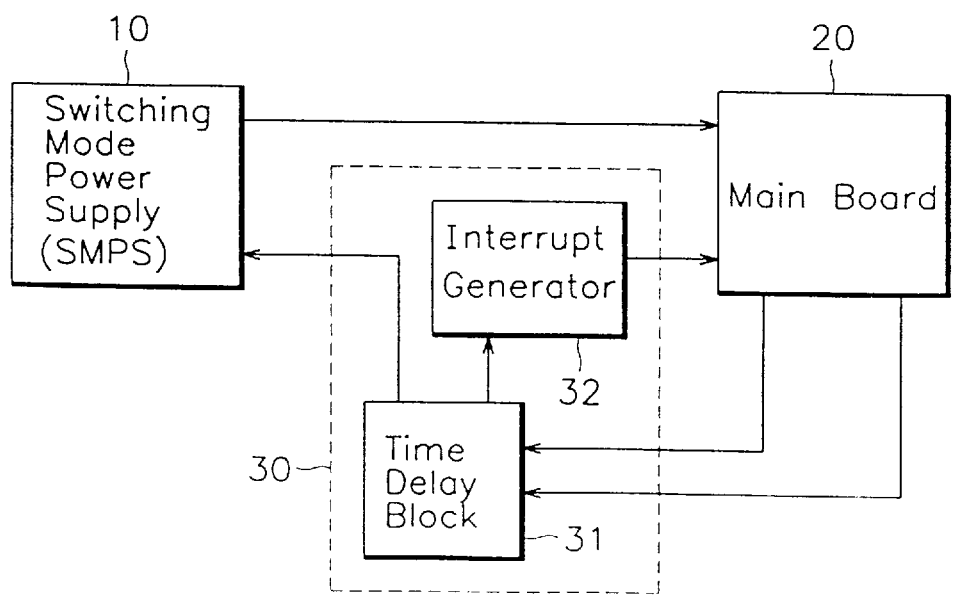
FIG. 2 is a block diagram illustrating a structure of a control system for an auto shutdown of a power supply constructed according to the principles of the present invention.
Figure 3:
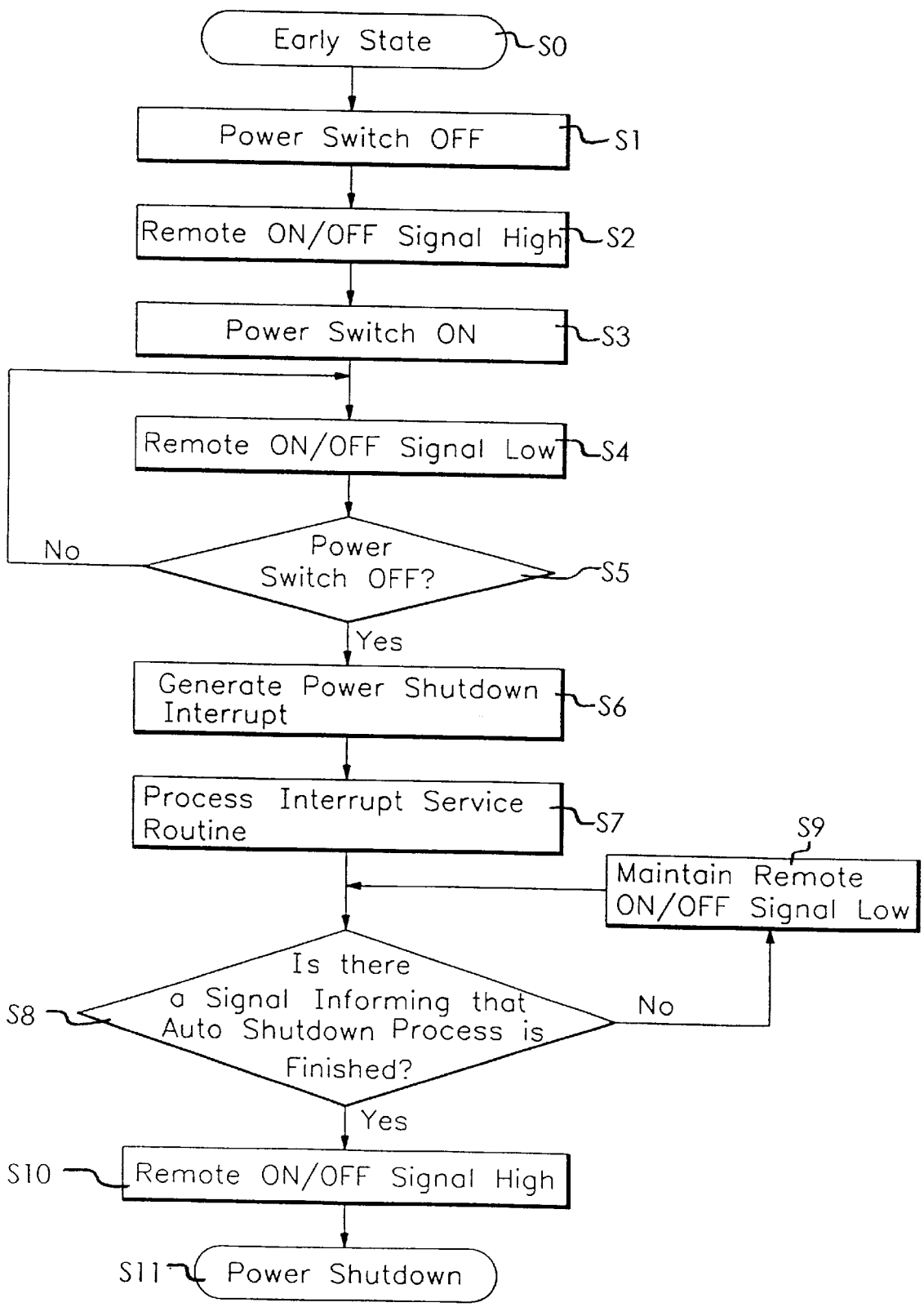
FIG. 3 is a flowchart showing the operation of the control system for the auto shutdown of the power supply when operated according to the principles of the present invention.

FIG. 2 is a block diagram illustrating a structure of a control system for an auto shutdown of a power supply according to a preferred embodiment of the present invention, FIG. 3 is a flowchart showing the operational steps of a control system for an auto shutdown of a power supply according to a preferred embodiment of the present invention, and FIG. 4 is a detailed circuit diagram illustrating a control system for an auto shutdown of a power supply according to a preferred embodiment of the present invention.

Referring to FIG. 2, the control system for auto shutdown of power supply according to the preferred embodiment of the present invention comprises a switching mode power supply (SMPS) 10 for receiving an AC voltage and converting the AC voltage into a DC voltage, a main board 20 for receiving the DC voltage output from SMPS 10, and a control circuit 30 for controlling the supply of power from SMPS 10 to main board 20 until a shutdown process is performed when power is turned OFF.

The control circuit 30 includes a time delay block 31 for delaying the shutdown of the power supply by maintaining the remote ON/OFF signal inputted into SMPS 10 to be OFF; and an interrupt generator 32 for informing main board 20 that the power is turned OFF according to a normal system operation.

Time delay block 31 includes, as shown in FIG. 4, a power double-pole single-throw switch SW311 having terminals connected to a voltage source Vcc via resistor R12, a reference potential or ground and a pull-up resistor R 11 in SMPS 10 for controlling the DC voltage supplied from SMPS 10 to main board 20, an asynchronous set-reset D flip-flop D312 for receiving a power supply signal and a power shutdown signal output from main board 20, a field effect transistor T313 having a drain terminal connected to a node between the pull-up resistor R11 and power switch SW311, a gate terminal connected to an output terminal Q of the asynchronous D flip-flop D312, and a source terminal connected to a reference potential or ground, the operation state of transistor T313 being changed according to an output state of flip-flop D312 for controlling the remote ON/OFF signal being supplied to SMPS 10, and an inverter IN314 for inverting a power supply signal input to a SET terminal S of flip-flop D312 when a power shutdown signal for activating a RESET terminal R of flip-flop D312 is input.

Interrupt generator 32 includes a synchronous D flip-flop D321 having a Q output terminal for providing an interrupt signal to main board 20 in response to receipt of a signal from power switch SW311 at clock terminal CLK. The D input terminal of flip-flop D321 is connected to Vcc via resistor R13.

Referring now to FIG. 3, the operation of the control system for an auto shutdown of a power supply according to the preferred embodiment of the present invention is as follows.

In an early state (S0) when the power switch SW311 is turned OFF (S1), SMPS 10 is in an OFF state and does not supply the DC voltage to main board 20 since a high remote ON/OFF signal (S2) is input to SMPS 10. Additionally, since the voltage Vcc applied to clock terminal CLK of synchronous D flip-flop D321 via resistor R12 remains in a high state, i.e., clock terminal CLK is not toggled from a low state to a high state, no interrupt signal is input to main board 20 via the Q terminal of flip-flop D321. When power switch SW311 is turned ON (S3), the remote ON/OFF signal becomes low (S4) and SMPS 10 is turned ON and supplies the DC voltage to main board 20.

Additionally, main board 20 outputs a power supply signal having a low state to set terminal S of asynchronous D flip-flop D312 and thus activates set terminal S, and main board 20 outputs a power shutdown signal having a high state to reset terminal R of the asynchronous D flip-flop D312 and thus does not activate reset terminal R. Accordingly, an output terminal Q of asynchronous D flip-flop D312 in time delay block 31 outputs a high signal. The high output signal from asynchronous D flip-flop D312 turns field effect transistor T313 on, and the remote ON/OFF signal remains low. Also, when power switch SW311 is turned ON, the voltage Vcc applied to clock terminal CLK of synchronous D flip-flop D321 via resistor R12 is grounded and thus becomes low. Accordingly, clock terminal CLK is not toggled from a low state to a high state, thus no interrupt signal is input to main board 20 via the Q terminal of flip-flop D321. Thereafter, when power switch SW311 is turned OFF (S5), the DC voltage supplied to main board 20 should be cut off, however, the remote ON/OFF signal remains in the low state and SMPS 10 keeps supplying the DC voltage to main board 20 since a high signal is still being output from the Q output terminal of asynchronous D flip-flop D312 in time delay block 31 enabling field effect transistor T313 to keep the remote ON/OFF signal in the low state.

Since power switch SW311 was turned OFF, the voltage Vcc is again supplied to clock terminal CLK. Accordingly, clock terminal CLK of the synchronous D flip-flop D321 in the interrupt generator 32 is changed from a low state to a high state causing synchronous D flip-flop D321 to output an interrupt signal having a high state (S6). The high interrupt signal output by synchronous D flip-flop D321 is input into a non-maskable interrupt NMI terminal of a central processing unit 21 in main board 20, and a system firmware receives an NMI signal, perceives that the NMI signal is a power failure interrupt for auto power shutdown by an interrupt polling system, and performs a corresponding interrupt service routine and shutdown process (S7) during which the remote ON/OFF signal remains in the low state (S9).

After performing the interrupt service routine, a power shutdown signal having a low state, indicating that the shutdown process due to the power-OFF is finished (S8), is supplied to reset terminal R of asynchronous D flip-flop D312, thereby activating reset terminal R. The power shutdown signal is changed from low to high through the inverter IN314 and input into set terminal S of asynchronous D flip-flop D312, and set terminal S is not activated.

Upon reset activation of asynchronous D flip-flop D312 the Q output signal becomes low thus turning off field effect transistor T313, and the remote ON/OFF signal is changed from low to high (S10) and input into SMPS 10. Accordingly, SMPS 10 stops suppling the DC voltage to main board 20 and the power shutdown (S11) is complete.

As described above, the present invention advantageously generates an interrupt signal as soon as the power switch is turned off thus controlling a system, e.g., a central processing unit, to perform a shutdown process prior to allowing the voltage level applied to the system to drop thus ensuring that damage to a file or the system is prevented. Consequently, with the present invention, a control system automatically shuts down the supply of electrical power while preventing a file from being damaged or the system from corrupted due to automatic precipitous interruption of power during the shutdown process by the power control system, even though the power switch may have been turned OFF due to the carelessness of the user or by some other external factor.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A control system for auto shutdown of a power supply, comprising:

a switching mode power supply for generating a DC voltage by receiving an AC voltage and converting said AC voltage into said DC voltage;

a main board for receiving said DC voltage generated by said switching mode power supply, said main board generating a power supply signal upon receipt of said DC voltage;

delay means having a power switch for turning said switching mode power supply on in order to generate said DC voltage when said power switch is switched from an open state to a closed state and for delaying turning said switching mode power supply off when said power switch is switched from said closed state to said open state;

a pull-up resistor connected between a voltage source and said power switch for enabling said switching mode power supply to generate said DC voltage when said power switch is switched from said open state to said closed state; and means for generating an interrupt signal when said power switch is switched from said closed state to said open state, said interrupt signal being provided to said main board for controlling an interrupt service routine and power shutdown operation;

said main board generating a power shutdown signal for output to said delay means upon completion of said interrupt service routine and power shutdown operation;

said delay means turning off said switching mode power supply in response to said power shutdown signal.

2. The control system as set forth in claim 1, said delay means comprising:

an asynchronous flip-flop having a set terminal connected to said main board for receiving said power supply signal, a reset terminal connected to said main board for receiving said power shutdown signal, a data terminal commonly connected to a clock terminal and to a reference potential, and a Q output terminal;

an inverter having an anode connected to said reset terminal and a cathode connected to said set terminal; and a field effect transistor having a gate connected to said Q output terminal, a source connected to said reference potential and a drain connected to said power switch.

3. The control system as set forth in claim 1, said means for generating an interrupt signal comprising:

a synchronous flip-flop having a clock terminal connected to a voltage source via a first resistor, a data input terminal connected to said voltage source via a second resistor and a Q output terminal for providing said interrupt signal to said main board.

4. The control system as set forth in claim 1, further comprising:

said power switch being formed from a double-pole single-throw switch for connecting said pull-up resistor to a reference potential when said double-pole single-throw switch is switched from said open state to said closed state.

5. The control system as set forth in claim 1, further comprising:

said means for generating an interrupt signal comprising a synchronous flip-flop having a clock terminal connected to a voltage source via a first resistor, a data input terminal connected to said voltage source via a second resistor and a Q output terminal for providing said interrupt signal to said main board; and said power switch being formed from a double-pole single-throw switch for commonly connecting said pull-up resistor and said clock terminal to a ground when said double-pole single-throw switch is switched from said open state to said closed state.

6. The control system as set forth in claim 5, said delay means comprising:

an asynchronous flip-flop having a set terminal connected to said main board for receiving said power supply signal, a reset terminal connected to said main board for receiving said power shutdown signal, a data terminal commonly connected to a clock terminal and to said ground, and a Q output terminal, said Q output terminal of said asynchronous flip-flop outputting a high logic value signal in response to a low logic value of said power supply signal when said main board receives said DC voltage generated by said switching mode power supply, said Q output terminal of said asynchronous flip-flop outputting a low logic value signal in response to said power shutdown signal having a low logic value upon completion of said interrupt service routine and power shutdown operation;

an inverter having an anode connected to said reset terminal and a cathode connected to said set terminal, said inverter applying a high logic value signal to said set terminal in response to said power shutdown signal having a low logic value upon completion of said interrupt service routine and power shutdown operation; and a field effect transistor having a gate connected to said Q output terminal of said asynchronous flip-flop, a source connected to said ground and a drain connected to a node between said pull-up resistor and said power switch, said field effect transistor being turned on when said Q output terminal of said asynchronous flip-flop outputs said high logic value signal, and maintains said switching mode power supply in an on state until said until said Q output terminal of said asynchronous flip-flop outputs said low logic value signal in response to said power shutdown signal having said low logic value.

7. A control system for auto shutdown of a power supply, comprising:

a switching mode power supply for generating a DC voltage by receiving an AC voltage and converting said AC voltage into said DC voltage;

a main board for receiving said DC voltage generated by said switching mode power supply, said main board generating a power supply signal upon receipt of said DC voltage;

delay means having a power switch for turning said switching mode power supply on in order to generate said DC voltage when said power switch is switched from an open state to a closed state and for delaying turning said switching mode power supply off when said power switch is switched from said closed state to said open state; and means for generating an interrupt signal when said power switch is switched from said closed state to said open state, said interrupt signal being provided to said main board for controlling an interrupt service routine and power shutdown operation;

said main board comprising a central processing unit having a non-maskable interrupt terminal for receiving said interrupt signal, said main board generating a power shutdown signal for output to said delay means upon completion of said interrupt service routine and power shutdown operation;

said delay means turning off said switching mode power supply in response to said power shutdown signal.

8. A control method for auto shutdown of a power supply, said method comprising the steps of:

supplying a remote ON/OFF signal having a low logic value to a switching mode power supply in response to a power switch being switched from an open state to a closed state;

turning said switching mode power supply on in response to said remote ON/OFF signal having said low logic value, said switching mode power supply converting a received AC voltage into a DC voltage when turned on;

generating a power supply signal having a low logic value by supplying said DC voltage to a main board;

generating and supplying an interrupt signal to a central processing unit having a non-maskable interrupt terminal for receiving said interrupt signal, said central processing unit being disposed on said main board, in response to said power switch being switched from said closed state to said open state;

performing an interrupt service routine and power shutdown operation in response to said interrupt signal;

generating a power shutdown signal when said interrupt service routine and power shutdown operation is completed; and turning said switching mode power supply off in response to said power shutdown signal.

9. The method as set forth in claim 8, further comprising the steps of:

maintaining said remote ON/OFF signal at said low logic value in response to said power supply signal having said low logic value; and converting said power supply signal from said low logic value to a high logic value in response to said power shutdown signal.

10. A control system for auto shutdown of a power supply, comprising:

a switching mode power supply for converting an AC voltage into a DC voltage when turned on;

a power switch for supplying a remote ON/OFF signal having a low logic value to said switching mode power supply when switched from an open state to a closed state, said switching mode power supply being turned on in response to said remote ON/OFF signal having said low logic value;

means for generating an interrupt signal in response to said power switch being switched from said closed state to said open state;

a main board for receiving said DC voltage generated by said switching mode power supply, said main board generating a power supply signal having a low logic value upon receipt of said DC voltage, said main board performing an interrupt service routine and power shutdown operation in response to said interrupt signal and generating a power shutdown signal having a low logic value when said interrupt service routine and power shutdown operation is completed, said main board comprising, a central processing unit having a non-maskable interrupt terminal for receiving said interrupt signal; and means for turning said switching mode power supply off in response to said power shutdown signal.

11. The control system as set forth in claim 10, said means for generating said interrupt signal comprising a synchronous flip-flop having a clock terminal connected to a voltage source via a first resistor, a data input terminal connected to said voltage source via a second resistor and a Q output terminal for providing said interrupt signal to said main board.

12. The control system as set forth in claim 10, said power switch comprising:

a first node coupled to said switching mode power supply for providing said remote ON/OFF signal to said switching mode power supply; and a double-pole single-throw switch having a first pole connected to a voltage source via a first resistor, a second pole connected to ground and a pair of wipers commonly coupled to said first node, said remote ON/OFF signal having said low logic value being supplied to said switching mode power supply when said voltage source is connected to said ground in response said double-pole single-throw switch being switched from said open state to said closed state.

13. The control system as set forth in claim 12, said means for turning said switching mode power supply off comprising:

an asynchronous flip-flop having a set terminal connected to said main board for receiving said power supply signal, a reset terminal connected to said main board for receiving said power shutdown signal, a data terminal commonly connected to a clock terminal and to said ground, and a Q output terminal;

an inverter having an anode connected to said reset terminal and a cathode connected to said set terminal; and a field effect transistor having a gate connected to said Q output terminal, a source connected to said ground and a drain connected to said first node.

14. The control system as set forth in claim 12, said means for generating said interrupt signal comprising a synchronous flip-flop having a clock terminal connected to said voltage source via said first resistor, a data input terminal connected to said voltage source via a second resistor and a Q output terminal for providing said interrupt signal to said central processing unit.

15. The control system as set forth in claim 14, said switching mode power supply having a pull-up resistor connected between said voltage source and said first node of said power switch for enabling said switching mode power supply to generate said DC voltage when said double-pole single-throw switch is switched from said open state to said closed state, said double-pole single-throw switch commonly connecting said pull-up resistor and said clock terminal to said ground when said double-pole single-throw switch is switched from said open state to said closed state.

16. The control system as set forth in claim 12, said switching mode power supply having a pull-up resistor connected between said voltage source and said first node of said power switch for enabling said switching mode power supply to generate said DC voltage when said power switch is switched from said open state to said closed state.

17. The control system as set forth in claim 12, said means for turning said switching mode power supply off comprising:

an asynchronous flip-flop having a set terminal connected to said main board for receiving said power supply signal, a reset terminal connected to said main board for receiving said power shutdown signal, a data terminal commonly connected to a clock terminal and to said ground, and a Q output terminal, said Q output terminal of said asynchronous flip-flop outputting a high logic value signal in response to said low logic value of said power supply signal when said main board receives said DC voltage generated by said switching mode power supply, said Q output terminal of said asynchronous flip-flop outputting a low logic value signal in response to said power shutdown signal having a low logic value upon completion of said interrupt service routine and power shutdown operation;

an inverter having an anode connected to said reset terminal and a cathode connected to said set terminal, said inverter applying a high logic value signal to said set terminal in response to said power shutdown signal having a low logic value upon completion of said interrupt service routine and power shutdown operation; and a field effect transistor having a gate connected to said Q output terminal of said asynchronous flip-flop, a source connected to said ground and a drain connected to a node between said pull-up resistor and said power switch, said field effect transistor being turned on when said Q output terminal of said asynchronous flip-flop outputs said high logic value signal, and maintains said switching mode power supply in an on state until said until said Q output terminal of said asynchronous flip-flop outputs said low logic value signal in response to said power shutdown signal having said low logic value.

* * * * *